United States Patent [19]

Stoves

[11] Patent Number: 4,473,091

[45] Date of Patent: Sep. 25, 1984

[54] FLUID FLOW CONTROL VALVES

[75] Inventor: Derek Stoves, Westerhope, England

[73] Assignee: British Gas Corporation, London, England

[21] Appl. No.: 441,932

[22] Filed: Nov. 15, 1982

Related U.S. Application Data

[63] Continuation of Ser. No. 246,941, Mar. 24, 1981, abandoned.

[30] Foreign Application Priority Data

Jan. 26, 1981 [GB] United Kingdom ................ 8102289

[51] Int. Cl.³ .......................... F16K 1/12; F16K 39/00
[52] U.S. Cl. ...................................... 137/219; 251/282
[58] Field of Search ................ 137/219; 251/123, 124, 251/282, 333 A

[56] References Cited

U.S. PATENT DOCUMENTS

| | | | |
|---|---|---|---|
| 2,269,671 | 1/1942 | Kinzie | 137/219 |
| 2,516,996 | 8/1950 | Jensen | 251/282 |
| 3,087,705 | 4/1963 | Hamilton | 251/282 X |
| 3,319,649 | 5/1967 | Cummins | 251/282 X |
| 4,137,934 | 2/1979 | Rice et al. | 251/282 X |
| 4,351,353 | 9/1982 | Filidoro et al. | 251/282 X |

Primary Examiner—Alan Cohan
Assistant Examiner—John A. Rivell
Attorney, Agent, or Firm—Oblon, Fisher, Spivak, McClelland & Maier

[57] ABSTRACT

A fluid flow control valve has a body enclosing a transfer passageway whose bounding surface is profiled to provide streamline flow conditions. The passageway is constricted by means of a piston-like valve moving transverse to the direction of fluid flow. A profiled shield protects the valve from direct impingement of fluid.

4 Claims, 3 Drawing Figures

FLUID FLOW CONTROL VALVES

This is a continuation, of application Ser. No. 246,941, filed Mar. 24, 1981 and now abandoned.

BACKGROUND OF THE INVENTION

1. Field of the Invention

This invention relates to valves for the control of fluid flow and, in particular, to regulator valves for installation in gas supply pipes.

2. Description of the Prior Art

In a control system governing fluid flow, out-of-balance forces across the head of the control valve will degrade the performance of the system. Such out-of-balance forces occur due to differences in area of the upstream and downstream faces of the valve head, pressure differences across the valve and fluid momentum due to impingement of the fluid on the valve head.

Various methods have been proposed to reduce the effects of out-of-balance forces. One technique is to employ a dual-ported valve. Another is to allow fluid from opposite sides of the valve head to communicate with a compensating piston attached to the same spindle.

Both of these techniques exhibit disadvantages. For example, with the first technique the assembly is rather bulky and requires the two valves to close precisely simultaneously, and with the second technique, the pressure will vary across the face of the valve, therefore, transferring pressure from a specific location will not provide accurate compensation. In such conventional regulator valves, when closed or almost closed, the areas of the upstream and downstream faces of the piston differ in addition to the difference due to the cross-sectional area of the spindle. Complex passageways are required to trasfer pressure from the valve head to the balance piston.

In order to overcome these disadvantages, a novel valve for control of fluid flow has been devised.

SUMMARY OF THE INVENTION

According to the present invention there is provided a valve for the control of fluid flow in a conduit comprising a valve body to contain the fluid and having an inlet opening for the ingress of fluid and an outlet opening for the egress of fluid, a passageway between said inlet opening and said outlet opening for the conduct of said fluid, sliding piston-like valve means to constrict the flow of said fluid in said passageway and slidably movable substantially transverse to the direction of flow at the point of construction of said flow, and shielding means upstream of said sliding piston-like valve means to shield said valve means from said upstream flow.

With this form of valve various factors may be utilized alone, or in combination, to improve the balance of forces across the valve. These factors include utilized a piston-like moving valve head, shielding the upstream face of the valve from fluid impingment, reducing downstream turbulence by suitable profiling, using a seal such as a diaphragm to prevent upstream pressure from acting on the upstream face of the piston, using ports to transfer downstream pressure to the upstream face of the piston, and making the valve of cylindrical form and attaching it to a spindle by means of webs.

BRIEF DESCRIPTION OF THE DRAWINGS

An embodiment of the invention will now be described by way of example with reference to the accompanying drawings in which.

DETAILED DESCRIPTION OF THE PREFERRED EMBODIMENTS

Figure 1:
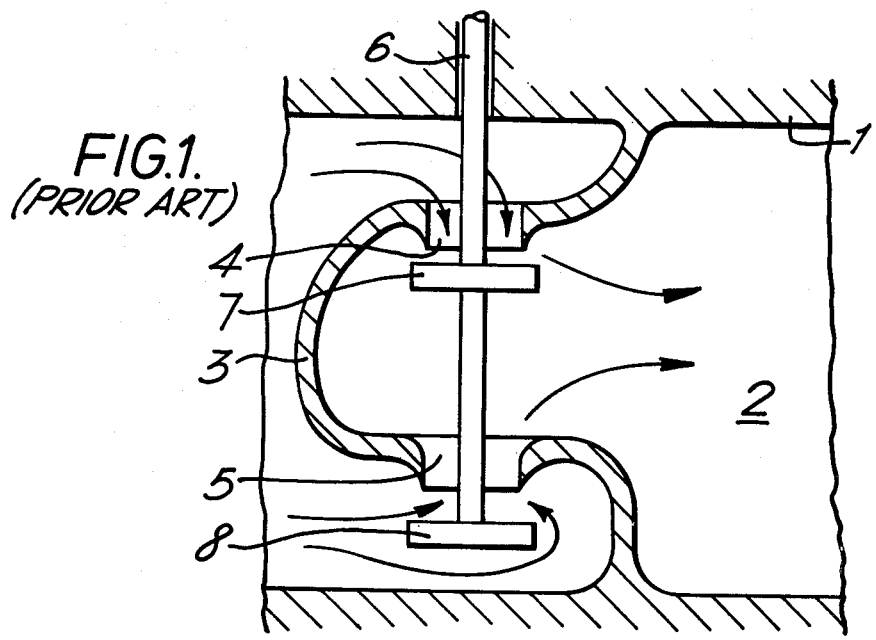
FIG. 1 shows one form of prior art valve

Referring now to FIG. 1 of the drawings, this shows a form of dual-ported valve employed to reduce out-of-balance forces. A valve body 1 encloses a fluid conduit 2 which is closed by a barrier 3 having two ports 4,5 therein. The ports are of equal size. A spindle 6 carries two valve closure members 7,8 and is movable in a direction axial to the flow of fluid at the ports to constrict the flow which is indicated by means of arrows. As will be apparent, the forces on the pistons from the flow of fluid tend to compensate one another, but the construction of the valve is not compact.

Figure 2:
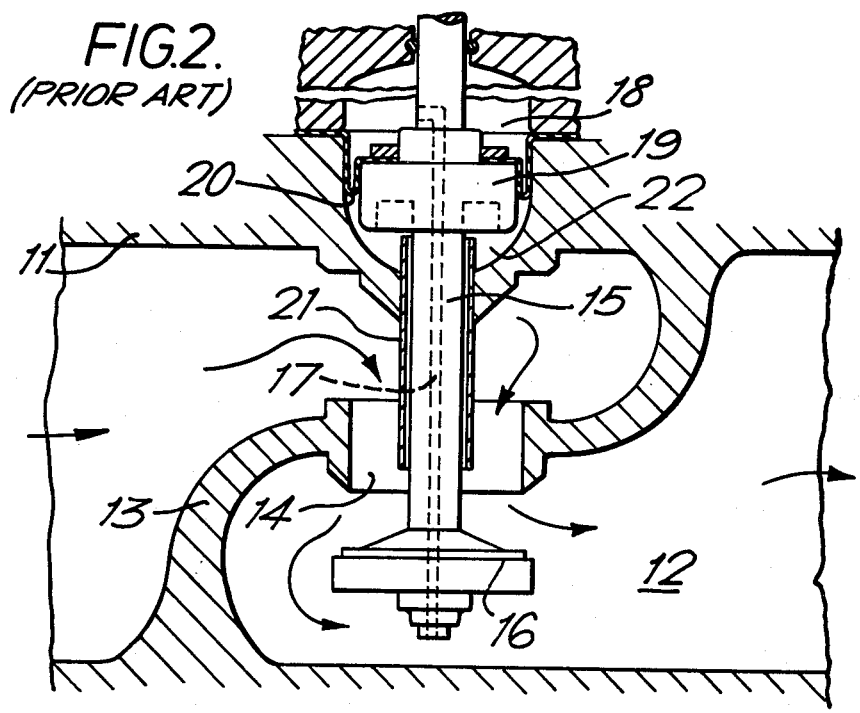
FIG. 2 shows another form of prior art valve.

An alternative form of compensated valve is shown in FIG. 2. A valve body 11 encloses a fluid conduit 12 which is closed by a barrier 13 having a port 14 therein. A spindle 15 carries a closure member 16 and a piston 19 and encloses a passage 17 which communicates at one end with the downstream side of the port closure member 16. The other end of the passage 17 communicates with a compensating chamber 18 above the piston 19 which is sealed from the upstream side of the valve port by a flexible diaphragm 20. A chamber 22 below the piston 19 communicates with the upstream side of the valve port 14 via an annular gap between the spindle 15 and a tube 21 in which the spindle slides. Whilst this valve construction is more compact than the dual-ported valve, it has the disadvantages already mentioned in respect of said known second technique.

Figure 3:
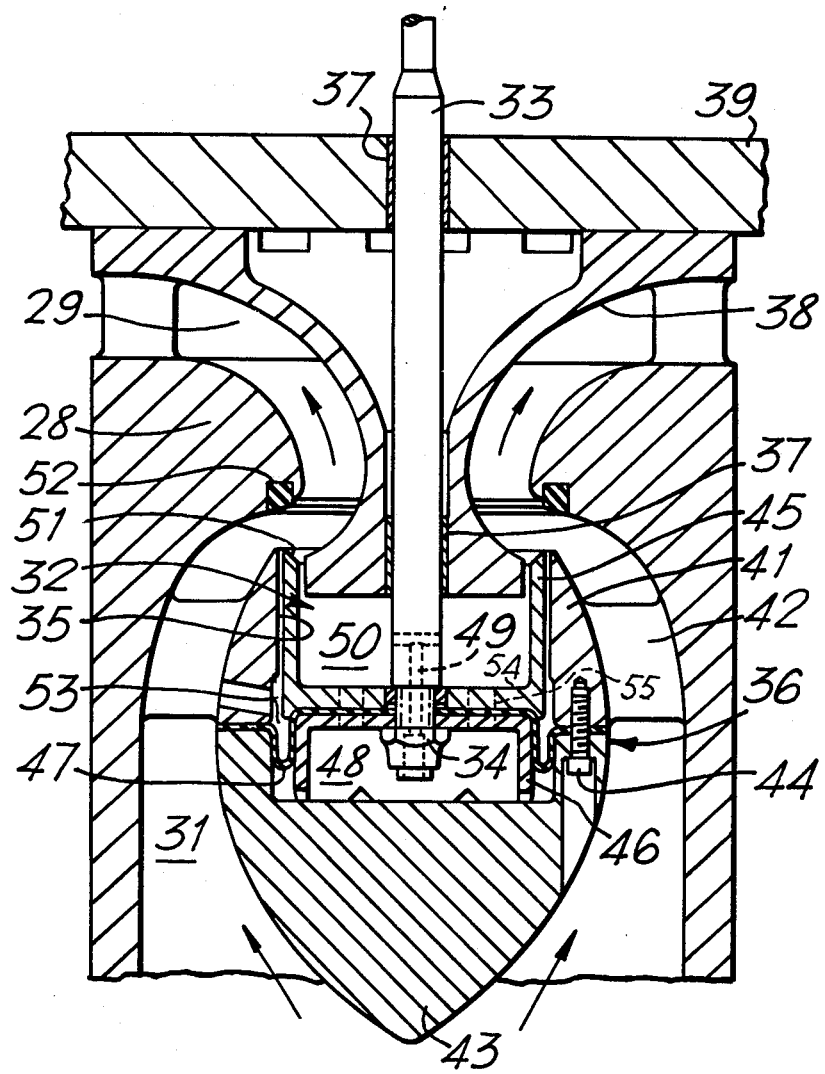
FIG. 3 illustrates a fluid control valve in accordance with a specific embodiment of the invention.

The valve construction now proposed, one embodiment of which is illustrated in FIG. 3, provides a more compact structure due both to the force balance being performed on the valve head itself (thus eliminating the need for an additional valve or piston as in said previous proposals) and to the axial movement of its closure member. The valve comprises a body 28 having a downstream chamber 29 and an upstream chamber 31 the internal surfaces of which are profiled to reduce turbulence. A valve head 32, in the form of a piston-like or webbed cylinder, is mounted on a spindle 33 and retained by means of a hexagon nut 34 and is movable within a cylindrical aperture 35 in a valve housing 36. The valve head actuating spindle 33 is guided by bearings 37 in a deflector 38, which is a part of the valve body 31, and a bulkhead 39.

The valve housing 36 comprises an upper deflector part 41, supported by webs 42 from the body 28 and a lower deflector part 43 bolted to the part 41 by bolts 44. The upper and lower parts 41, 43 are disposed so as to shield the valve head 32 from fluid flow and are shaped to encourage streamline flow. The disposition of the gas flow throat or passageway between the downstream and upstream chambers 29,31 is such that the motion of the valve head is substantially transverse to the direction of the flow at the point of the throat constriction. A rolling diaphragm seal 47 is clamped between the two components 45 and 46 of the valve head 32 and between the upper and lower deflector parts 41, 43 of the valve housing 36 creating a compensating chamber 48 which is isolated from the upstream gas flow. A transfer port 49 in the spindle 33 has openings to the compensating chamber 48 and to a valve upper chamber 50 coupling the compensating chamber 48 to the essentially downstream gas pressure in the chamber 29. The upper component 45 of the valve head 32 has a bevelled edge 51 which closes against a seating member 52.

With this form of construction, pressure balance is achieved by means within the valve head. This eliminates the necessity to use the space-consuming double-ported valve of FIG. 1 or the additional balance piston attached to the valve control spindle remote from the valve head of FIG. 2.

It will be seen that the balance of forces across the valve is achieved by utilizing a piston-like or webbed cylindrical form of moving valve head, shielding the upstream face from fluid impingement, shielding the majority of the downstream area of the valve head from tubulence and profiling the sealing edge to ensure that substantially steady and uniform pressure acts on the entire end faces of the valve head. The use of the diaphragm seal 47 prevents upstream pressure acting on the upstream face of the valve. A step or taper 53 in the piston wall may be necessary to compensate for pressure force on the diaphragm seal 47. As an alternative to the use of transfer ports 49 for transfer of the downstream pressure to the upstream face of the valve, the valve head 32 may be of cylindrical form attached to the spindle 33 by means of a web 54 having openings 55 therein.

The concentric structure of the valve and its moving parts permits the mounting of the valve coaxially within the valve body.

Preferably the actuating spindle 33 of the valve is on the downstream side of the throat restriction, thereby eliminating the need for a seal between the valve spindle and a spindle-actuating means.

Where, for example, a diaphragm or other actuator means is employed with the valve to control downstream pressure, a feedback signal can be taken directly from an annulus region under the bulkhead 39 and outside the valve body 28. Preferably this annulus region will be large so as effectively to create essentially stagnant flow conditions.

I claim:

1. A valve for the control flow of fluid in a conduit comprising:

a body defining a passageway for the flow of fluid therethrough and having an inlet opening and an outlet opening connected to said passageway, sliding piston-like means within said body to constrict the flow of fluid in said passageway at a defined location wherein said piston-like means is movable at substantially 90° to the direction of flow of said fluid at said defined location where said fluid is constricted, said piston-like means further comprising a seating member at said defined location for receiving an edge of said piston-like means to stop said flow of fluid, a portion of said edge comprising a surface exposed to downstream pressure when said flow is stopped, and shielding means upstream of said location to shield said sliding piston-like means from upstream flow, wherein said sliding piston-like means and said shielding means cooperate to form a compensating chamber which communicates with the fluid flow path downstream of said defined location and whereby said compensating chamber is isolated from said upstream fluid flow when said valve is closed and wherein said outlet opening and said inlet opening each communicates with annular regions outside said valve body, which inlet and outlet regions each are large in comparison with said passageway at said defined location where said fluid flow is constricted; and said valve further comprising clamping means and a rolling diaphragm seal means affixed to said piston-like means by said clamping means, said seal means further being affixed to said shielding means and disposed between said piston-like means and said shielding means, said piston-like means further comprising an elementary piston means having a step means for compensating for pressure force acting on said rolling diaphragm seal.

2. A fluid flow control valve according to claim 1 wherein the compensating chamber communicates with the fluid flow path by way of a transfer port.

3. A fluid flow control valve according to claim 1 wherein said compensating chamber communicates with the fluid flow path by way of openings in a web supporting said piston-like means.

4. A fluid flow control valve according to claim 1 wherein said sliding piston-like means is mounted on a spindle which is positioned downstream of said location.

* * * * *